Patented Sept. 23, 1941

2,256,832

UNITED STATES PATENT OFFICE 2,256,832

SAND CORE AND METHOD OF MAKING SAME

Oscar H. King, Provo, Utah, assignor to Pacific States Cast Iron Pipe Co., Provo, Utah, a corporation of Nevada No Drawing. Application June 22, 1936, Serial No. 86,696

13 Claims. (Cl. 22—188)

This invention relates to the production of dry sand cores, to dry and green sand core material and to molding sand for use in making metallic castings, whether ferrous or nonferrous, such as from iron, steel, aluminum and bronze, and it aims to provide such cores, core material and sand as will resist moisture, with particular reference to green sand castings, their storage and production in quantities, sand cores which will be of adequate dry strength, readily portable, and cheaper than those made with mixtures containing oxidizing oils, asphalt, pulverized cereals, dextrine, resin, glutrin-goulac, or pitch.

Sand cores, sand core material and sand of the nature indicated, in accordance with the invention, contain gilsonite and any equivalent. This material is abundant in nature, and found principally in the eastern part of Utah.

The term "gilsonite," as used in this specification and appended claims, includes not only gilsonite but also the equivalent materials falling within the category of bitumens, which include dark colored, comparatively hard and comparatively non-volatile solids, composed principally of saturated hydrocarbons, substantially free from oxygenated bodies and crystallizable paraffins, sometimes associated with mineral matter, the non-mineral constituents being difficultly fusible, and largely soluble in carbon disulphide, the fusion point of gilsonite being usually above 230° F. More specifically among equivalents of the character mentioned are glance pitch, grahamite, and other hydrocarbons with like properties, but not including asphalts.

I have ascertained, through actual practice, that gilsonite and similar hydrocarbons, not including asphalt, are more efficient as binders in forming foundry cores, whether dry or green, and in producing the molding sand material, than are the natural asphalts or pitches, resins and asphalts derived from pyrogenous distillations. The gilsonite has a higher dry strength value per pound of substance used than the asphalts and pitches, the method of application determining the percentage of increase.

The gilsonite has a high melting point (usually over 230° F.), adequate hardness to permit easy grinding, low ash content (ordinarily 0.5%), high susceptibility factor, and is 98% to 100% soluble in carbon disulphide. Natural gilsonite and equivalents (not including asphalts) are low in fixed carbon (ordinarily 10% to 20%) and are practically 100% combustible, enabling the production of cores which are easily cleaned from the castings.

In practicing the invention, any grade of sand suitable for foundry use may be employed, and the gilsonite is added thereto in percentages ranging usually from 0.2% to 6.0%, according to the dry strength desired. Gilsonite is so effective as a binding agent that one part thereof can be used with 40 parts of sand, by weight or volume. Also, for making dry sand cores, an advantage in employing gilsonite is that regular heap sand may be used. The gilsonite is ground to a fine mesh, preferably 100 mesh, or finer, to attain more uniform dissemination and quicker reaction with oils and solvents. The ground or pulverized gilsonite is mixed or mulled in any manner or apparatus, thoroughly with the sand and/or other materials. After this thorough admixture, oil or solvent, preferably a cheap mineral oil, crude oil, gas oil, or the like is added in sufficient quantity to wet the grains of gilsonite and mulled and mixed, for uniform admixture, greater surface coverage, and to impart green strength properties.

Where greater strength or skin drying effect is desired in the sand core and other mixtures according to the invention, the gilsonite or equivalent, not including asphalts, is added in percentages usually ranging from 0.2% to 6% in a finely ground or pulverized form to the mixture of sand and cereal, dextrine, sugar, glutrin-goulac, or similar binder or binders, resulting in stronger cores which are waterproof and moisture resistant, attained at low cost, by replacement of the linseed oil, all cereal binders and all sorghum products, such as molasses, or similar or other oil binders usually employed.

The fact that the cores have gilsonite therein is decidedly advantageous, since the cores will not absorb moisture in humid climates, and large numbers of such cores may be made up for future use without danger of atmospheric deterioration.

Gilsonite is efficiently used in the skin drying of molds by mixing the same with a high volatile oil, such as gasoline, naphtha, benzol, or other solvent and spraying on cores and molds to prevent the molten metal from "burning in" the sand. Such spray on the molds may be ignited in the skin drying thereof, to supplant the use of blow torches or gas burners, as commonly used for this purpose. As an example of such a spray, I may use one pound of gilsonite to one-half gallon of gasoline, naphtha, benzol, or the like.

Where clays or bentonites or similar binders are employed to increase the green strength, usually in large cores, the sand and clay are thoroughly mulled or mixed, the water added, and then the gilsonite added in percentages ranging usually from 0.2% to 6.0%, according to the dry strength required, and then mulled or mixed, say, from two to three minutes. The efficiency is decreased by longer mixing or mulling, because the gilsonite grains then become coated with clay. Gilsonite, in this case, replaces the usual binder pitch with better dry strength and moisture resistance.

The cores using gilsonite and equivalents, according to the invention, are less liable to overburning and loss of their binding properties at core drying temperatures, the maximum strength being obtained at temperatures of from 300° to 400° F. Longer heating at these temperatures serves little purpose, but does not deteriorate the core strength. A substantial and important saving is due to the fact that uniformity of temperature control is unnecessary under the present invention.

Concerning the use of the invention for sand cores and sand core mixtures for metallic castings, whether ferrous or nonferrous, the gilsonite is used in percentages usually ranging from 0.2% to 6.0%, as binding media in combination with mineral oils, vegetable oils, animal oils, or solvents which soften or dissolve hydrocarbons, effecting a more uniform dissemination of the gilsonite throughout the sand mixture; or in combination with cereal, dextrine, glutringoulac, or similar type bindings, or clays and bentonites, for increasing dry strength and resistance to moisture. An important advantage of the present invention is the provision of a cheaper substitute binder for the linseed oil and similar binders which might have equivalent properties or excel on a pound for pound basis.

For molding purposes, in the case of light weight castings, one part of gilsonite to fifty parts of sand are used when starting a new sand heap. After the heap is started, the amount of gilsonite required to replenish the sand heap and keep it in proper condition will be about one part of gilsonite to 900 parts of sand.

When molding heavy weight castings, the following mixture, in which the proportions are approximate, may be employed:

| | Parts |
|---|---|
| Gilsonite | 1⅓ |
| Clay | 8 |
| Water | 4 |
| Sand | 86⅔ |
| Total | 100 |

For green sand cores, the following mixture may be employed, it being understood that the proportions are only approximately given:

| | Parts |
|---|---|
| Gilsonite | 2 |
| Clay | 2 |
| Water | 10 |
| Sand | 86 |
| Total | 100 |

The gilsonite in the molding and core sand deoxidizes the molten metal because the air in the mold is displaced by carbon dioxide, which is created by the contact of the molten metal with the pulverized gilsonite in the molding and core sand. This is important because in making steel castings, carbon dioxide gas is used in the molds to displace the atmospheric air therein before pouring the steel. This old practice is far more expensive than the present invention, since the use of the gilsonite automatically generates the carbon dioxide gas when the molten metal contacts the gilsonite in the sand.

The residue left from gilsonite, after casting, is pure carbon, which, in turn, has coated the sand grains making the sand most ideal for future use. The sand grains do not cluster together, as with asphalt or pitch binders. Gilsonite leaves no gangue in sand like asphalt binders and which fill the voids between the sand grains and render the sand less permeable, causing the asphalt bonded sand to be unfit for future use.

Asphalt or pitch binders have such a high percentage of solids in proportion to volatile constituents that the "burning in," which occurs on castings, is much greater than with the high volatile gilsonite, which is more efficient for "peeling."

Where "parts" are referred to herein concerning gilsonite and other materials, they are the same whether said parts be determined by weight, by volume, or by percentage.

The "dry strength" mentioned herein refers to the ability of the rammed baked sand and binder or binders to withstand applied stresses, such as compression, tension and bending.

The "green strength" mentioned herein refers to the ability of the rammed green sand to resist compression and tension stresses.

It will be understood that the various examples given are not to be taken as limitary, but are capable of modification, and that other changes may be resorted to within the spirit and scope of the invention.

I claim as my invention:

1. A sand core comprising particles of sand bound into an integrated body by fused gilsonite.

2. A mixture for use in core-making, comprising sand and gilsonite so proportioned that the gilsonite when fused acts to bind the sand into an integrated body.

3. A mixture for use in molding, comprising sand and gilsonite so proportioned that the gilsonite when fused acts to bind the sand into an integrated body.

4. A mixture for use in molding and core making comprising sand and gilsonite so proportioned that the gilsonite when fused acts to bind the sand into an integrated body.

5. A mixture for use in core-making, comprising sand and gilsonite proportioned in the ratio of from 14 to 30 parts sand to one part gilsonite, by volume, wherein the gilsonite when fused acts to bind the sand into an integrated body.

6. A process of making sand cores for use with ferrous and non-ferrous castings, said process comprising incorporating with the sand between 0.2% and 6.0% of gilsonite as a binder.

7. A process of making sand cores for use with ferrous and non-ferrous castings, said process comprising incorporating with the sand between 0.2% and 6.0% of gilsonite as a binder in conjunction with a solvent for the gilsonite.

8. A process of making sand cores for use with ferrous and non-ferrous castings, said process comprising incorporating with the sand between 0.2% and 6.0% gilsonite as a binder in conjunction with other types of core binders.

9. A sand material for molding and the like uses having gilsonite therein in a percentage of at least 1¾.

10. A sand core binder material consisting of the product of gilsonite 1⅓ to 2 parts; clay 2 to 8 parts; water 4 to 10 parts and sand 86 to 86⅔ parts.

11. A spray material for molds and cores, comprising gilsonite and a volatile liquid solvent vehicle in which it is carried.

12. A spray material for molds and cores, comprising gilsonite and a highly volatile oil which serves as a vehicle for the gilsonite and in which the gilsonite is dissolved.

13. The method of skin drying a mold, consisting in spraying the mold with a volatile oil containing gilsonite, and in thereafter igniting the oil.

OSCAR H. KING.